United States Patent [19]

Bakker et al.

[11] Patent Number: 4,464,813
[45] Date of Patent: Aug. 14, 1984

[54] SNAP HOOK

[75] Inventors: John A. Bakker, Bartlett; Gilbert Solarz, Des Plaines, both of Ill.

[73] Assignee: Illinois Tool Works Inc., Chicago, Ill.

[21] Appl. No.: 534,935

[22] Filed: Sep. 26, 1983

Related U.S. Application Data

[63] Continuation of Ser. No. 387,109, Jun. 10, 1982, abandoned.

[51] Int. Cl.³ .............................................. A44B 13/02
[52] U.S. Cl. ....................................... 24/237; 24/236
[58] Field of Search ................................. 24/237, 236

[56] References Cited

U.S. PATENT DOCUMENTS

| | | | |
|---|---|---|---|
| 266,421 | 10/1882 | Blake | 24/237 |
| 548,694 | 10/1895 | Breul | 24/237 |
| 705,622 | 7/1902 | Speht | 24/237 |
| 1,234,531 | 7/1917 | Daniels | 24/237 |
| 1,829,232 | 10/1931 | Morehouse | 24/237 |
| 1,841,423 | 1/1932 | Wells | 24/237 |
| 2,019,691 | 11/1935 | Morehouse | 24/237 |
| 3,130,463 | 4/1964 | Posey | 24/255 R |
| 3,383,741 | 5/1968 | Salomon | 24/236 |
| 3,583,750 | 6/1971 | Norton | 24/200 |
| 3,719,974 | 3/1973 | Abrams | 24/237 |
| 4,050,187 | 9/1977 | Geiger et al. | 24/237 |
| 4,061,873 | 12/1977 | Berg, Jr. | 24/237 |
| 4,074,401 | 2/1978 | Spinosa et al. | 24/236 |
| 4,113,156 | 9/1978 | Brito | 24/237 |

FOREIGN PATENT DOCUMENTS

| | | | |
|---|---|---|---|
| 342245 | 10/1921 | Fed. Rep. of Germany | 24/237 |
| 2626748 | 12/1977 | Fed. Rep. of Germany | 24/237 |
| 4393 | of 1910 | United Kingdom | 24/237 |
| 1412809 | 11/1975 | United Kingdom | 24/237 |

Primary Examiner—Paul J. Hirsch
Attorney, Agent, or Firm—Thomas W. Buckman; John P. O'Brien

[57] ABSTRACT

A snap hook comprising a bi-ended base portion, a blade portion, a re-entrant portion and a latch portion, is disclosed. The blade is integral with a first end of the base, through the re-entrant portion, thereby providing the snap hook with an aperture intermediate the base and the blade. The aperture has a mouth and two integrally formed lips. The aperture is adapted to receive a substantially cylindrical portion of a retainer therein. The latch is integral with the second end of the base and thereby provides the snap hook with a corner at the junction thereof. A free end of the blade and a free end of the latch are in distal relation to the base. A relaxed condition for the snap hook is defined to be when the distal end of the blade is above the distal end of the latch, in relation to the base. A locked condition for the snap hook is defined to be when the distal end of the blade is positioned beneath the distal end of the latch, in relation to the base. The lips are adapted to lockingly retain the above-mentioned substantially cylindrical portion of the retainer while the snap hook is in the locked condition.

2 Claims, 23 Drawing Figures

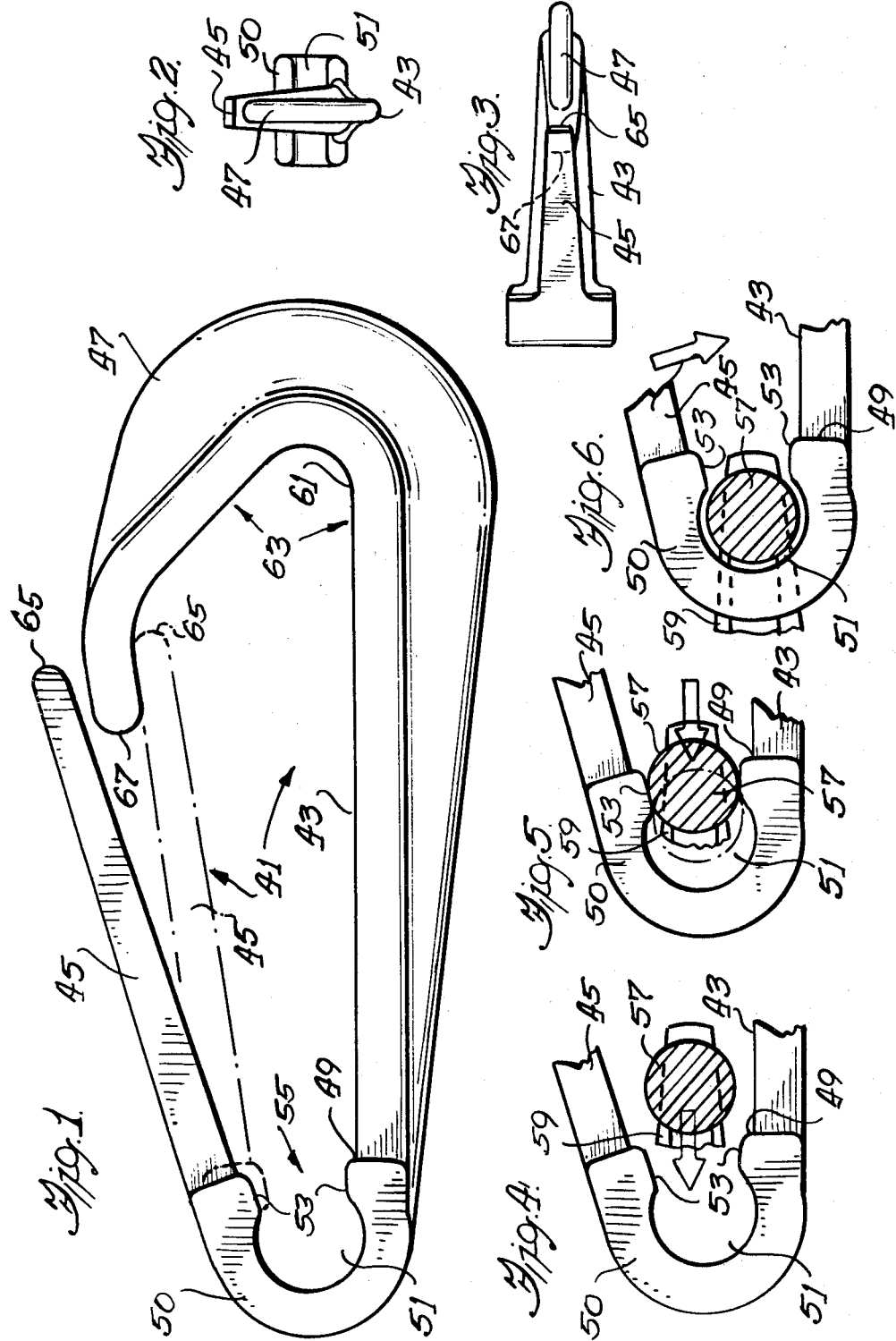

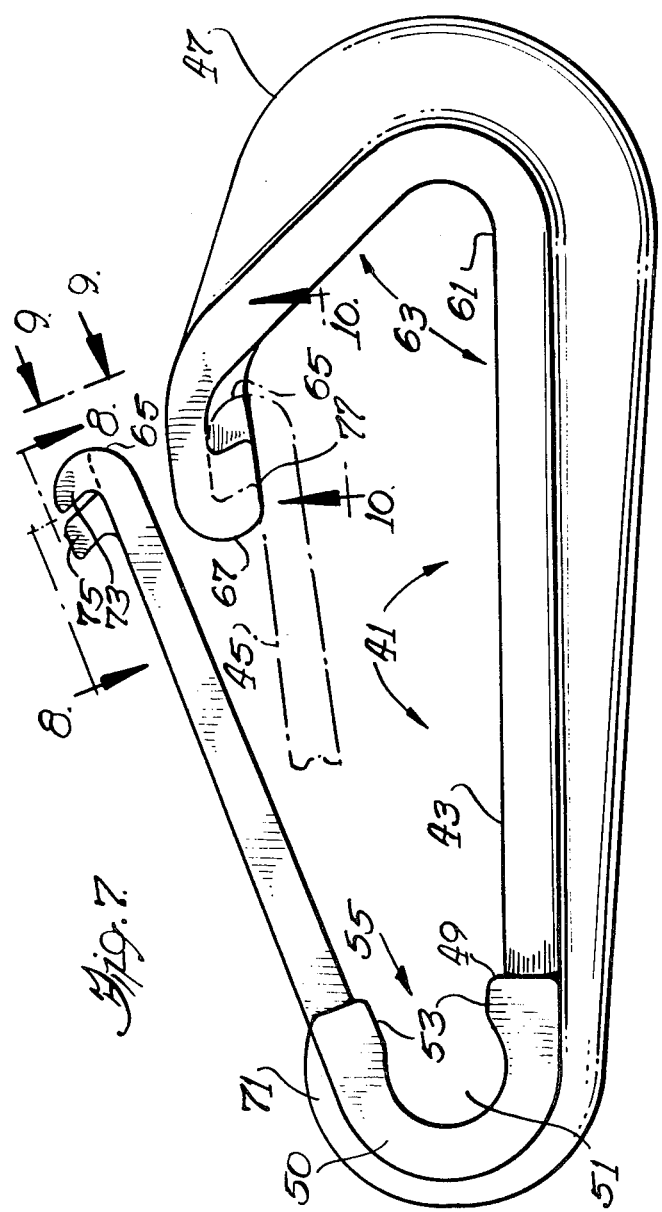
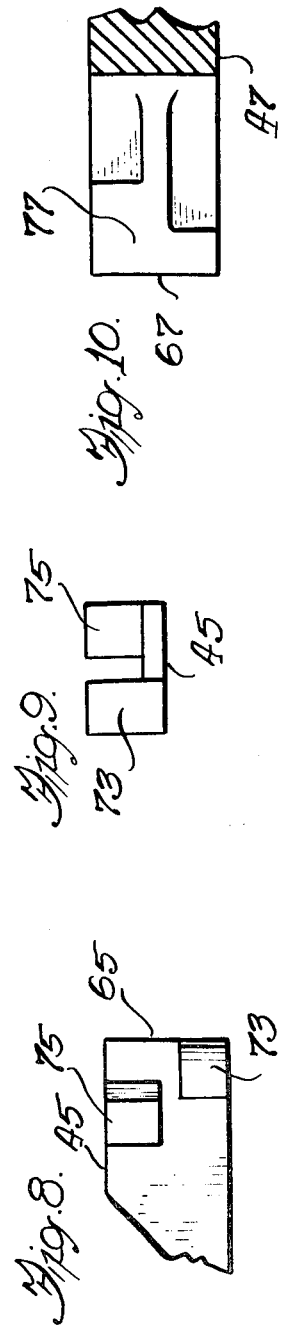

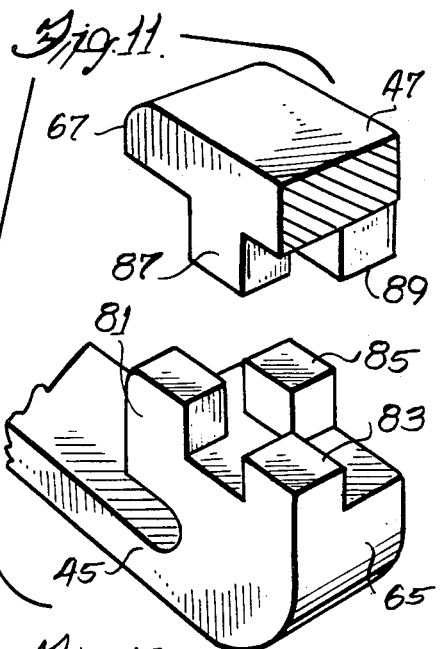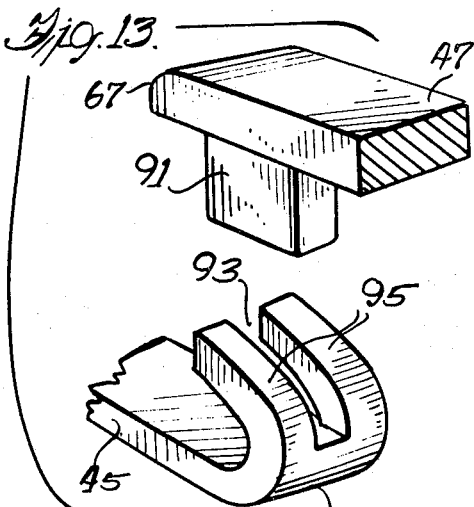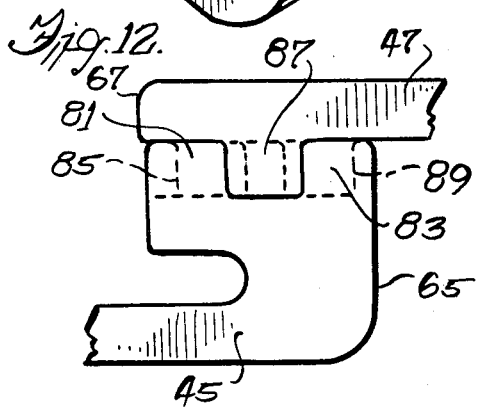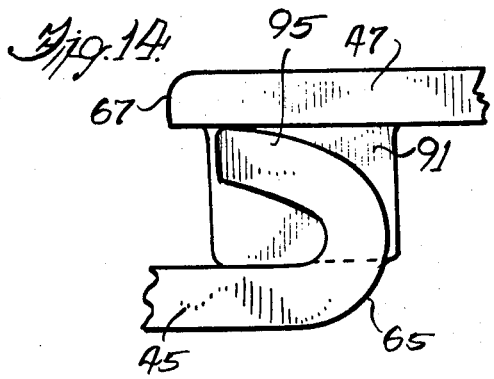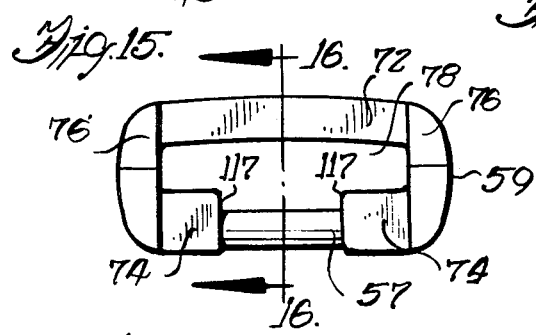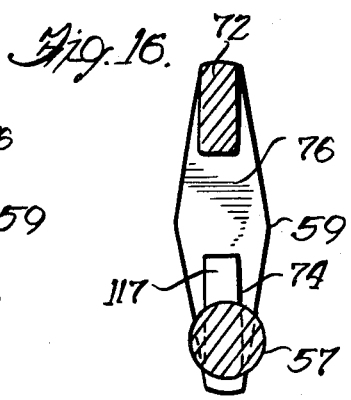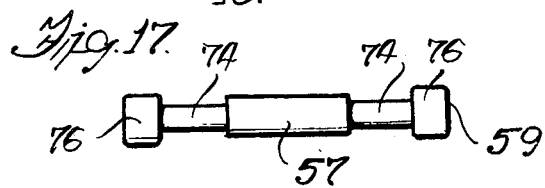

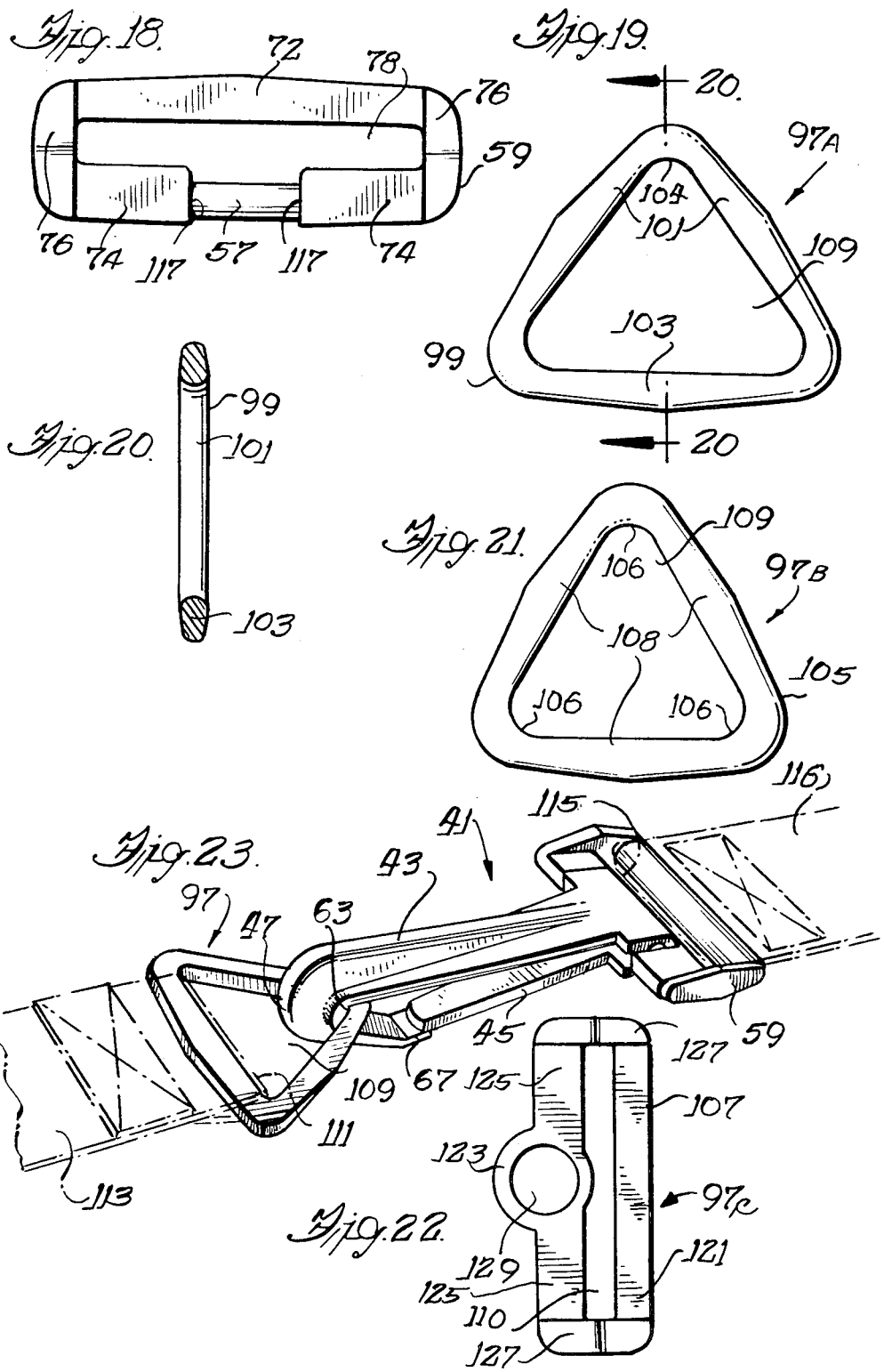

SNAP HOOK

This application is a continuation of application Ser. No. 387,109, filed 6/10/82 now abandoned.

BACKGROUND OF THE INVENTION

This invention is directed to a novel snap hook, and more particularly to a novel snap hook having a mouth or aperture adapted to cooperate with a snap hook retainer.

Many commercially available clasping devices, such as snap hooks, are not easy to use either because they do not permit facile or quick engagement with a claspable thing such as a co-operating ring or like member, or because they do not readily permit disengagement from such a co-operating member. For example, certain snap hooks are generally not fixed in relation to ring-like members being clasped thereby; thus, prior to disengagement of the snap hook from such a ring-like member, it is first necessary to locate the clasping mechanism of the snap hook.

In addition to co-operative use with such ring-like members, commercially available snap hooks are also used in combination with ends of belts, straps, webbing or the like. In one such use, the snap hook is either used to keep or maintain one end of the webbing in tension with another end of the webbing, or is used to keep one end of the webbing in fixed relation to the other end of the webbing.

A problem is often encountered when tension becomes relaxed between such ends of webbing because the clasping portion of the snap hook thus is permitted to move in relation to the ring-like member being clasped thereby and quick release from the snap hook of the clasped ring-like member is often not possible. In addition, such a snap hook may incorporate a clasping mechanism which is complicated or otherwise difficult to operate.

Many commercially available snap hooks are of complicated design and include a variety of parts. Furthermore, many such snap hooks incorporate parts or components which wear out, break down, or otherwise fail to perform in a satisfactory manner.

Some commercially available snap hooks are made of metal and thus are subject to corrosion. Many of these have sharp edges that do injury to people or damage to property. Moreover, such snap hooks may require an external coating for aesthetic purposes.

It is desirable to provide a snap hook which can be manufactured at a minimal cost; and which is durable, corrosion resistant and rust proof, simple in construction, easy to use, and aesthetically pleasing.

OBJECTS AND SUMMARY OF THE INVENTION

Accordingly, it is a general object of this invention to provide a novel and improved snap hook.

A more specific object is to provide such a snap hook which is simple in construction and which is of one-piece design.

A further object is to provide such a snap hook which is easy to use and which generally permits facile engagement of a clasping portion thereof with a separate claspable member.

A still further object is to provide such a snap hook which generally permits quick release or disengagement of a clasping portion thereof, from a member clasped thereby.

A related object is to provide such a snap hook having a clasping mechanism which is easy to locate, even after tension has been relaxed between a clasping portion of the snap hook and a separate member being clasped thereby.

Yet, another object is to provide a retaining member adapted to cooperate with the snap hook.

A further object is to provide a snap hook retaining device.

Another object is to provide a snap hook system comprising a snap hook and a retaining member adapted to lockingly engage with the snap hook; such snap hook system including a separate claspable member adapted to permit quick and easy engagement with or disengagement from a clasping portion of the snap hook.

A further object is to provide such a snap hook system which is made of a smoothly molded and suitably resilient synthetic substance, such as plastic, such plastic also being durable, whereby the snap hook system does not have sharp edges, does not rust, and additionally is impervious to most chemicals.

Yet another object is to provide such a snap hook system which can be made in different colors and which, therefore, can be color coordinated, if desired.

Briefly, and in accordance with the foregoing objects, an integrally formed snap hook comprising a bi-ended base portion, a blade portion, a re-entrant portion, and a latch portion, is disclosed.

The blade is integral with a first end of the base through the re-entrant portion or section thereby providing the snap hook with an aperture intermediate the junction of the base and the blade. The aperture has a mouth and two distally positioned and integrally formed lips. The aperture is adapted to receive a retainer.

The latch is integral with the other end of the base. A free end of the blade is in distal relation to the base. A free end of the latch is also in distal relation to the base. When the distal end of the blade is above the latch (such as it would be when the snap hook is viewed from the side, the re-entrant section appearing at the left of the view, the base appearing at the bottom) the snap hook is thus in a "relaxed condition". A "locked condition" is defined when the distal end of the blade is positioned (such as by being snapped) between the latch and the base.

The re-entrant portion flexes and the aperture mouth closes slightly when the snap hook is moved from the relaxed condition to the locked condition. With the snap hook in the relaxed condition, the lips of the aperture mouth are adapted to engage a cylindrical portion of the retainer as such portion of the retainer is pushed past the lips and snapped into the aperture. The aperture is adapted to receive or substantially surround the above-mentioned cylindrical portion of the retainer or retaining member while the snap hook is in the locked condition; and the aperture lips are adapted to lockingly retain this cylindrical section or portion of the retaining member within the aperture. The snap hook is maintained in such a locked condition by a biased engagement between the distal ends of the blade and the latch of this novel snap hook.

BRIEF DESCRIPTION OF THE DRAWINGS

The foregoing, as well as other objects, features and advantages of the invention will become more readily understood upon reading the following detailed description of the illustrated embodiments, together with reference to the drawings, wherein:

FIG. 1 is a side view of an integrally formed snap hook incorporating features of the present invention;

FIG. 2 is a right-end view (reduced in size) of the snap hook of FIG. 1;

FIG. 3 is a top view (also reduced in size) of the snap hook of FIG. 1;

FIG. 4 is substantially the view of FIG. 1, partially in section, and including a sectional view of a cylindrical portion or section of a snap hook retaining member approaching the aperture of the snap hook;

FIG. 5 shows the cylindrical retaining member section negotiating the lips of the aperture while the snap hook is in a relaxed condition;

FIG. 6 shows the retainer after the cylindrical portion of the retainer has been pushed past the lips of the aperture and the snap hook has been moved from the relaxed condition to the locked condition;

FIG. 7 is the side view of another embodiment of the snap hook of the present invention;

FIG. 8 is a sectional view taken generally along the line 8—8 of FIG. 7 illustrating one embodiment of a locking feature of the blade portion of the snap hook;

FIG. 9 is an end view taken generally along the line 9—9 of FIG. 7;

FIG. 10 is a sectional view taken generally along the line 10—10 of FIG. 7 illustrating a complementary feature of the latch portion of the snap hook;

FIG. 11 is a perspective view, partially in section, illustrating another embodiment of the locking feature of the blade and latch portions of the snap hook;

FIG. 12 is an assembled side view of the embodiment of FIG. 11;

FIG. 13 is a perspective view, partially in section, illustrating yet another embodiment of the locking feature of the blade and latch portions of the snap hook;

FIG. 14 is an assembled side view of the embodiment illustrated in FIG. 13;

FIG. 15 is a side view of one embodiment of a retainer adapted to be used in combination with the novel snap hook of this invention;

FIG. 16 is an end view, partially in section, taken generally along the line of 16—16 of FIG. 15;

FIG. 17 is a bottom view of the snap hook retainer of FIG. 15;

FIG. 18 is an end view of yet another embodiment of such a retainer;

FIG. 19 is a front view of one embodiment of a ring-like member adapted to be claspable by the snap hook of the present invention;

FIG. 20 is a side view, partially in section, taken generally along the line 20—20 of FIG. 19;

FIG. 21 is a front view of yet another embodiment of such a ring-like claspable member;

FIG. 22 is a front view of still another embodiment of such a ring-like claspable member: and FIG. 23 is a perspective view of one embodiment of the snap hook system of the present invention as used in combination with a pair of webbing ends.

DETAILED DESCRIPTION OF THE ILLUSTRATED EMBODIMENTS

Referring to the drawings, and initially to FIG. 1, an integrally formed one-piece snap hook referred to generally by the reference numeral 41, will now be discussed. The snap hook 41 comprises a bi-ended base portion 43, a blade portion 45, a re-entrant portion 50, and a latch portion 47.

With reference to FIGS. 1 and 7, it will be seen that the blade 45 is integral with a first end 49 of the base 43 through the re-entrant portion 50. Referring to FIG. 3, it will be seen that the dimensions of the blade 45 converge outwardly from the re-entrant portion 50. In the embodiments presented in FIGS. 1, 4–6 and 7, it will be seen that the re-entrant section or portion 50 is generally C-shaped (when the snap hook 41 is viewed from the side). It also will be seen that the re-entrant portion 50 thus provides the snap hook 41 with an aperture 51. A preferred shape for the aperture 51 is a cylindrical surface of curvature having a substantially circular cross section, as presented in FIGS. 1, 4–6 and 7.

It can be seen, in FIGS. 1 and 7, that the aperture 51 has a mouth (referred to generally by the reference numeral 55) and two distally positioned and integrally formed lips 53. Referring to FIGS. 4–6, it will be seen that the aperture 51 is adapted to receive a cylindrical portion or section 57 of a retaining member or ring 59 which has been pushed past these lips 53 and into the aperture 51. Referring to FIGS. 4–6, it will also be seen that the cylindrical portion 57 of the retainer 59 has an outside diameter which is less than the inner diameter of the aperture 51, which thus permits the cylindrical portion 57 of the retainer 59 to freely pivot or turn within the aperture 51.

Referring to FIGS. 1 and 7, it will be seen that the latch 47 is integral with a second end 61 of the base 43. For the preferred embodiments of the present invention (presented in FIGS. 1 and 7), the latch 47 of the snap hook 41 is reversely bent toward the blade 45 at the second end 61 of the base 43 thereby providing the snap hook 41 with a pocket or corner (referred to generally by the reference numeral 63). The corner 63, together with the cooperation between the blade 45 and the latch 47, provides the snap hook 41 with the quality of being usable for clasping a wide variety of co-operating rings or like members. In the embodiments presented in FIGS. 1 and 7, the corner 63 is smooth and rounded; and the latch 47 and the second end 61 of the base 43 are joined thereat thereby providing the snap hook 41 with a substantially V-shaped clasping portion. It can be seen, when viewing FIGS. 1 and 7, that such clasping portion extends substantially from a distal end 67 of the latch 47 to the corner 63; and further includes substantially all of the base 43.

Referring to FIG. 1, it will be seen that a distal end 65 of the blade 45 is resiliently movable in relation to the base 43 of the snap hook 41; it will further be seen that the re-entrant portion 50 flexes as the snap hook 41 is moved from the "relaxed" to the "locked" condition. On the other hand, the distal end 67 of the latch 47 remains fixed in relation to the base 43. The resiliently movable features or qualities of the blade portion 45 and the re-entrant section 50 thus provide the snap hook 41 with a "springy" quality. The snap hook 41 is preferably made of a suitably resilient and sufficiently durable substance, such as a plastic, thereby providing principally the blade 45 and the re-entrant 50 portions of the snap hook 41 with this springy quality. A preferred material for the manufacture of the snap hook 41 is a strong, hard, resilient, highly crystalline thermoplastic commercially known as acetal resin. In addition to acetal resin, however, it can be appreciated that the snap hook 41 can be molded from any suitably tough, resilient, plastic material.

Moreover, it can be appreciated that the springy quality of the snap hook 41 can otherwise be adjusted by altering the dimensions of the C-shaped re-entrant portion 50 surrounding the aperture 51, by altering the dimensions of the blade 45, by altering the type of plastic used to manufacture the snap hook 41 or by altering the amount of plasticizer used in the compositional make-up or recipe of such a plastic (if such a plastic requires use of such a plasticizer). For example, referring to FIG. 7, it can be seen that the C-shaped re-entrant portion 50 (surrounding the aperture 51) can include another section or portion 71 formed integral therewith for increasing the force-resistive or resilient qualities of the re-entrant portion 50.

In one embodiment of the snap hook 41, presented in FIGS. 2 and 3, the distal end 65 of the blade 45, the distal end 67 of the latch 47 and the base 43, are substantially co-planar. Thus, when the re-entrant section 50 is subjected to a first force (a component of such a force being generally co-linear to the base 43) and the corner 63 is subjected to a second force, oppositely directed to the first, lateral movement of the distal end 65 of the blade 45 in relation to the distal end 67 of the latch 47 is substantially eliminated.

When the distal end 65 of the blade 45 is above the distal end 67 of the latch 47, as presented in FIGS. 1 and 7, the snap hook 41 is in a "relaxed condition". The hook 41 is in a "locked condition", as will be seen by referring to FIGS. 1 and 7, when the distal end 65 of the blade 45 is snapped beneath the distal end 67 of the latch 47. The preferred embodiment of the snap hook 41 is manufactured with the parts or sections being in the relaxed condition.

The snap hook 41 is adapted to be normally used in combination with the retainer 59. Referring to FIGS. 15-17, a first embodiment of such a retainer 59 is seen to be a generally rectangular ring having a first longer side 72, a second longer side (which is opposed to the first side 72) and which comprises end portions 74 integrally formed at respective ends of the cylindrical portion 57 of the retainer 59. The retainer 59 further includes a pair of integrally formed shorter sides 76 which join paired ends of the first and second longer sides 72 and 74. Furthermore, such a retainer 59 is provided with a substantially rectangular slot 78 through which an end of belting, strapping, webbing or the like can be secured. Referring to FIG. 18, it will be seen that a second embodiment of such a retainer 59 can be manufactured to have such components.

As noted above, the aperture 51 of the snap hook 41 and the cylindrical portion 57 of the retainer are adapted to have a complementary geometry. The unique relationship between the portion or section 57 of the retainer 59 and the aperture 51 of the snap hook 41 will next be discussed.

Briefly, referring to FIGS. 4-6, it will be seen that the C-shaped re-entrant section 50 resiliently flexes whereupon the mouth 55 closes slightly thereby bringing the lips 53 toward one another when the snap hook 41 is moved from the relaxed condition to the locked condition.

Furthermore, the snap hook 41 is specifically adapted to be used in combination with the retainer member 59, two embodiments of such a retainer 59 being presented in FIGS. 15-18, whereby the retainer 59, in turn, can be connected to an end of a strap or belt or other similar element (as illustrated in FIG. 23). The retainer 59 is cooperatively assembled with the snap hook 41 by snapping the cylindrical portion or section 57 of the retainer 59 past the lips 53 and into the aperture 51. This action is presented in FIGS. 4-6.

More specifically, while the snap hook 41 is in the relaxed condition, the cylindrical section 57 of the retainer 59 will be seen (referring to FIG. 4) approaching the lips 53 of the aperture 51. Reference to FIG. 5 presents the cylindrical section 57 of the retainer 59 engaging the lips 53 (while the snap hook 41 is in the relaxed condition) and the retainer 59 being pushed past the lips 53 and into the aperture 51. As soon as the cylindrical section 57 of the retainer 59 is snapped past the lips 53, the snap hook 41 can be moved into the locked condition by moving the blade 45 around the latch 47 and positioning the blade 45 therebelow in a biased manner, as can be seen by referring to the phantom lines in FIGS. 1 and 7. Such a biased engagement is made between the distal end 65 of the blade 45 and the distal end of the latch 47.

In FIG. 6, the co-operation between the cylindrical section 57 of the retainer 59 and the aperture 51 of the snap hook 41 will be seen while the snap hook 41 is in such a locked condition. As the lips 53 are brought toward one another when the snap hook 41 is moved into the locked condition, it can further be appreciated by referring to FIG. 6, that the lips 53 thus cooperate to lockingly retain the cylindrical section 57 of the retainer 59 within the aperture 51.

If desired, the retainer 59 can be removed from the aperture 51 of the snap hook 41 by reversing the procedure set forth above.

Referring to FIGS. 7-10, several features of a second embodiment of the invention will now be discussed.

It has previously been noted that the C-shaped re-entrant portion 50 can include the integrally formed section 71 for increasing the force-resistive or resilient qualities of the snap hook 41. The second embodiment will also be seen to include a plurality of projections 73, 75 and 77 specifically adapted to prevent both lateral and longitudinal movement of the distal end 65 of the blade 45 in relation to the distal end 67 of the latch 47 (while the snap hook 41 is in the locked condition). With the snap hook 41 in the locked condition, the projections 73 and 75 extend away from the distal end 65 of the blade 45 and also extend in the direction of the distal end 67 of the latch 47. The projection 77 extends away from the distal end 67 of the latch and in the direction of the distal end 65 of the blade 45, where it interfits with the projections 73 and 75. The projection 77 thus fits between the projections 73 and 75, and lateral movement of the distal end 65 of the blade 45, in relation to the distal end 67 of the latch 47, is effectively eliminated. The second embodiment of the snap hook 41 (FIG. 7), is thus highly resistant to disengagement of the blade 45 from the latch 47 while the snap hook 41 is in such a locked condition.

Referring to FIGS. 11-14, two more embodiments of this latch-locking feature will now be discussed.

Referring to FIGS. 11-12, it will be seen that such projections can take the form of interlocking blocks 81, 83, 85, 87 and 89. The substantially rectangularly-shaped blocks 81, 83 and 85 will be seen to extend outwardly from the distal end 65 of the blade 45 and to interfit with the substantially rectangularly-shaped blocks 87 and 89 of the distal end 67 of the latch 47.

Referring to FIGS. 13-14, it will be seen that such a latch-locking feature can also take the form of an extension 91 adapted to fit into a slot 93 between two projections 95. The substantially rectangularly-shaped extension 91 will be seen to extend outwardly from the distal end 67 of the latch 47 and to fit into the substantially rectangularly-shaped slot 93 formed between the two curled projections 95 which extend away from the distal end 65 of the blade 45. These are but a few of the embodiments that the latch-locking feature of the snap hook 41 can assume.

A variety of ring-like members, referred to generally by the reference numeral 97 and adapted to be clasped by the snap hook 41, will next be discussed.

Referring to FIGS. 19–20, it will be seen that one such claspable member 97A can be a triangular ring 99. The triangular ring 99 is integrally formed of a suitable plastic. The ring 99 is an isosceles triangle having legs 101 and a base 103. The triangular ring member 99 is normally clasped by the snap hook 41 by inserting the distal end 67 of the latch 47 through an open portion or hole 109 of the triangular ring 99 with the corner 63 of the snap hook 41 clasping an apex 104. The open portion or hole 109 is seen to be of a size and shape sufficient to accommodate an end of webbing or the like.

A second embodiment of a ring-like member 97B will be seen, by referring to FIG. 21, to be an equilateral triangle ring-like member 105 having sides 108. The triangluar ring member 105 is normally clasped by the snap hook 41 by inserting the distal end 67 of the latch 47 through the open portion or hole 109 of the triangular ring 105 with the corner 63 of the snap hook 41 clasping any apex 106.

Referring to FIG. 22, it will be seen that a third embodiment of such a ring-like member 97C is a rectangular ring 107 having a longer side 121, an opposite longer side comprising a circular portion 123 (approximately located in the middle of such opposed longer side) and shorter sections 125 extending outwardly from the circular portion 123, and shorter sides 127 which connect the longer side 121 to the opposed longer side. The rectangular ring 107 includes a slot 110 sufficient in size and shape to accommodate an end of webbing or the like. The rectangular ring 107 further includes a hole 129 centrally located within the circular portion 123. The rectangular ring 107 is normally clasped by the snap hook 41 by inserting the distal end 67 of the latch 47 through the hole 129 with the corner 63 of the snap hook 41 clasping the circular portion 123.

Referring to FIG. 23, it will be seen that the ring-like member 97 can be adapted to assume a shape consistent with a use therefor. The snap hook 41 is presented as holding a free end 111 of a piece of webbing 113 in fixed relation to another free end 115 of a second piece of webbing 116.

Moreover, the retainer 59 can assume a variety of shapes. Although the preferred embodiment of the retainer 59 is the substantially rectangular ring illustrated in FIGS. 15–18, and 23, it will be appreciated that only the cylindrical portion or section 57, bounded by the end portions 74, is a critical element of the retainer 59. Referring to FIGS. 15 and 16, it will be seen that the end portions 74 are adapted along an edge 117 to be substantially greater in linear dimension than is the diameter of the cylindrical portion or section 57 of the retainer 59 thereby retaining the cylindrical portion 57 with the aperture 51. The preferred retainer 59, moreover, is adapted at the edges 117 to substantially prevent free longitudinal movement of the cylindrical portion or section 57 as such pivots or turns within the aperture 51.

Thus, a snap hook system, as contemplated by this invention, comprises the snap hook 41, and the retainer member 59 (which is adapted to engage with the aperture 51 and thereby cooperate with the snap hook 41). Moreover, such snap hook system further includes the ring-like member 97 adapted to permit quick and easy engagement with (or disengagement from) a clasping portion or corner 63 of the snap hook 41. From this it can be seen that a single snap hook 41 may be used with various sizes of retainers 59 and ring-like members 97. Clearly, when various sizes of straps are used a complementary sized retainer 59 and ring-like member 97 should be used therewith. The advantage of the instant snap hook system being not only the novel construction of the component parts but the interchangeability of a single snap hook with preselected retainers 59 and ring-like members 97 of different sizes. For example, a one inch wide strap may be attached to a two inch wide strap or a three inch wide strap may be attached to a three inch wide strap, etc., where the retainer and ring-like member are properly sized for each respective strap, using the snap hook system of the instant invention. It should be evident that a single snap hook may be packaged with a plurality of different sizes of retainers 59 and ring-like members 97 giving the user the capability of attaching different pairs of straps where each pair is of a particular size as well as straps of different sizes with a single universal snap hook as described herein. It can be appreciated that the cooperation between the retainer 59 and the snap hook 41 aperture 51 provides a means for positively locating the snap hook in relation to the cylindrical section or portion 57 of the retainer member 59 while the cylindrical portion 57 is engaged in the aperture 51 and the snap hook 41 is in the locked condition.

It is further contemplated that such a snap hook system can be advantageously used in combination with ends of belting, strapping, webbing or the like; but that the usefulness of the invention is not limited to combinations therewith.

The preferred snap hook system is made from a single, durable and resilient substance such as the commercially available plastic described above, thereby avoiding costs resulting from manufacturing the snap hook system from dissimilar materials.

What has been illustrated herein is a novel snap hook. While the snap hook of the invention has been illustrated and described with reference to several preferred embodiments, the invention is not limited thereto. On the contrary, alternatives, changes or modifications may become apparent to those skilled in the art upon reading the foregoing description. Accordingly, such alternatives, changes or modifications are to be considered as forming a part of the invention insofar as they fall within the spirit and scope of the appended claims.

We claim:

1. In combination with a retainer, an integrally formed snap hook comprising: (a) a bi-ended base portion; (b) an elongated, tapered blade portion; (c) a re-entrant portion, a first end of said base portion being integral with said blade portion through said re-entrant portion thereby providing said snap hook with an aperture intermediate said base portion and said blade portion, said blade portion having at least one pair of opposed sides transverse to and uniformly converging outwardly from said re-entrant portion, said aperture forming an elongated mouth, said mouth having two spaced integrally formed lips at the entrance thereof;

and (d) a latch portion, a second end of said base portion being integral with said latch portion thereby providing said snap hook with a corner, a free end of said blade portion and a free end of said latch portion being in distal relation to said base portion, a relaxed condtion for said snap hook being defined when the blade free end is above the latch free end relative to said base portion, a locked condition for said snap hook being defined when said blade free end is positioned beneath said latch free end relative to said base portion, said latch free end and said blade free end being substantially co-planar and of substantially the same width, a first facing surface on said blade free end in opposing relation to a second facing surface on said latching free end, a first plurality of projections formed on said first facing surface and extending towards said latching free end, a second plurality of projections formed on said second facing surface and extending towards said blade free end, said first plurality of projections interfitting between said second plurality of projections while said snap hook is in said locked condition, said retainer including an integral elongated portion having a cross section such that said retainer having said elongated portion within said aperture is freely rotatable about said elongated portion when said snap hook is in said locked condition, said elongated portion having a pair of ends integral therewith and spaced at opposite ends thereof, said elongated portion ends being disposed transverse to and having a relatively greater linear dimension than said aperture, said lips being circumferentially spaced apart and being radially inwardly disposed along an inner surface of said aperture for enabling said elongated portion being transversely urged between and engaging said lips to be snapped into said aperture when said snap hook is in said relaxed condition, movement of said blade free end relative to said latch free end for changing said snap hook from said relaxed condtion to said locked condition causing said lips to come together for radially retaining said elongated portion within said aperture when said snap hook is in said locked condition, said snap hook being maintained in said locked condition by a biased engagement between said blade free end and said latch free end.

2. In combination with a retainer having an elongated member, a snap hook comprising: an elongated base; aperture means integral with a first end of said base for circumferentially containing said retainer member, said aperture means being resilient and including an elongated mouth for radially receiving said retainer member into and for radially removing said retainer member from said aperture means, said mouth having a pair of integral radially inwardly disposed lips circumferentially spaced at opposite sides of said mouth, said retainer member having a pair of spaced opposite end portions, each one of said end portions having a transverse cross section greater than that of said aperture means for axially retaining said retainer member within said aperture means; a hook integral with a second end of said base opposite said base first end; and aperture flexing means integral with said aperture means for enabling said lips to be spread apart to a first predetermined dimension and to be drawn together to a second predetermined dimension, an elongated tapered blade integrally connected to said aperture flexing means and extending from said aperture means toward said hook, said blade being narrower than said aperture flexing means at their juncture and having at least one pair of opposed sides transverse to and uniformly converging outwardly from said aperture flexing means, said hook reversely bent from said second end of said base towards the free end of said blade to form a V-shaped corner at the juncture of said hook and said second end of said base defining a V-shaped clasping portion, said hook having a free end biasly engageable with said blade free end, said latch free end and said blade free end being substantially co-planar and of substantially the same width, said retainer member having a cross section relative to a cross section of said aperture means such that said retainer having said retainer member in said aperture means is freely rotatable about said retainer member when said lips are spaced apart by said second dimension, said retainer member being radially urgeable between said lips into and out of said aperture means when said lips are spaced apart by said first dimension, said retainer member in said aperture means being radially retained therein by said lips and said aperture means when said lips are spaced apart by said second dimension.

* * * * *